A. S. MELLO.
COMBINED CLUTCH AND STOP MOTION.
APPLICATION FILED FEB. 1, 1917.

1,227,643.

Patented May 29, 1917.
3 SHEETS—SHEET 1.

Inventor.
Alfred S. Mello
by Heard Smith & Tennant.
Attys.

A. S. MELLO.
COMBINED CLUTCH AND STOP MOTION.
APPLICATION FILED FEB. 1, 1917.
1,227,643.
Patented May 29, 1917.
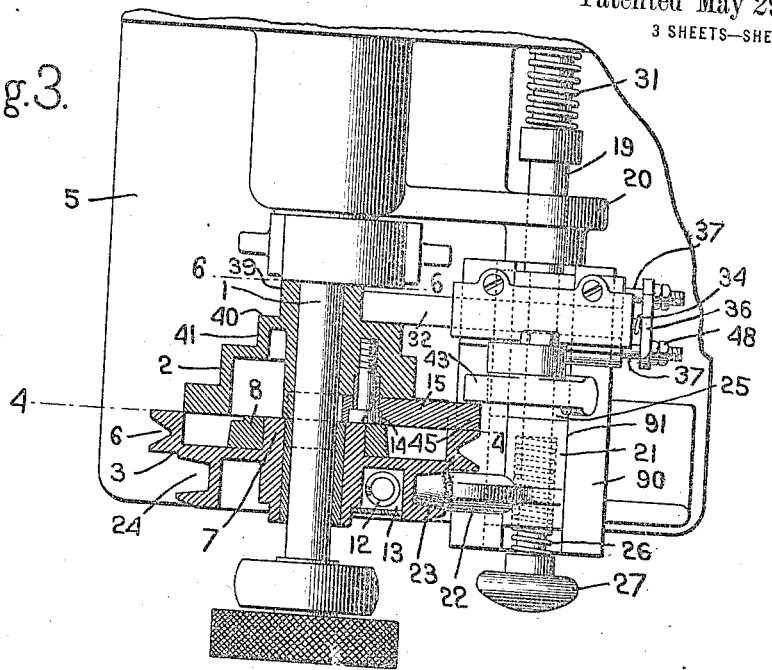
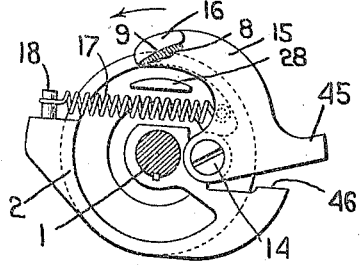
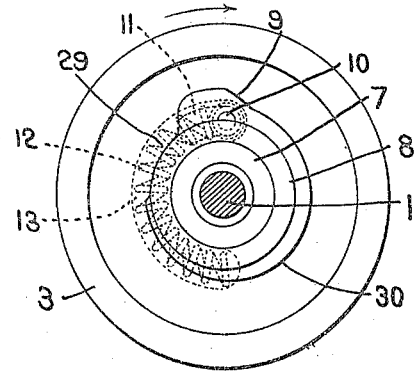
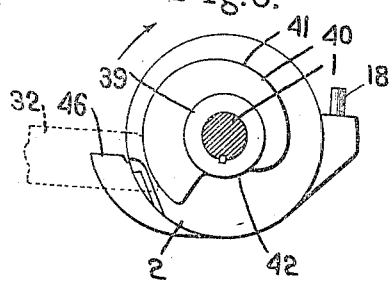
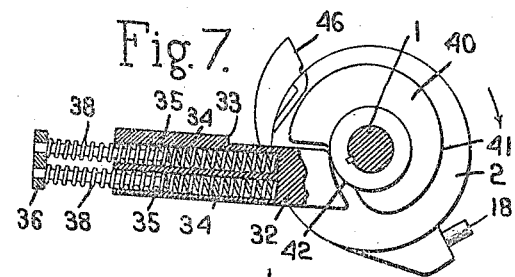
Inventor.
Alfred S. Mello
by Heard Smith & Tennant
Attys.

A. S. MELLO.
COMBINED CLUTCH AND STOP MOTION.
APPLICATION FILED FEB. 1, 1917.

1,227,643.

Patented May 29, 1917.
3 SHEETS—SHEET 3.

Inventor.
Alfred S. Mello
by Heard Smith & Tennant
Attys

UNITED STATES PATENT OFFICE.

ALFRED S. MELLO, OF CAMBRIDGE, MASSACHUSETTS, ASSIGNOR TO THE REECE BUTTON HOLE MACHINE COMPANY, OF BOSTON, MASSACHUSETTS, A CORPORATION OF MAINE.

COMBINED CLUTCH AND STOP MOTION.

1,227,643.

Specification of Letters Patent. Patented May 29, 1917.

Application filed February 1, 1917. Serial No. 146,012.

*To all whom it may concern:*

Be it known that I, ALFRED S. MELLO, a citizen of the United States, residing at Cambridge, county of Middlesex, State of Massachusetts, have invented an Improvement in Combined Clutch and Stop Motions, of which the following description, in connection with the accompanying drawing, is a specification, like characters on the drawing representing like parts.

This invention relates to a combined clutch and stop motion and particularly to a clutch and stop motion in which the two elements of the clutch have a positive driving connection as distinguished from a frictional driving connection.

The object of the invention is to provide a novel clutch and stop motion of this type in which when the clutch is thrown into engagement, the driven element will be started in rotation before the two clutch elements become positively engaged, thus providing for starting the driven element with an easy or cushioning movement.

Another object of the invention is to provide an improved clutch and stop motion of this type having novel means for bringing the driven member to rest with a gradual movement and in a predetermined position when the clutch is disengaged. While my improved clutch has a positive driving connection, yet nevertheless, it can be operated at high speed without subjecting the driven element to undue jar or strain.

In order to give an understanding of my invention, I have illustrated in the drawings a selected embodiment thereof which will now be described, after which the novel features will be pointed out in the appended claims.

Fig. 3 is a plan view showing the two clutch members in section on the line 3—3, Fig. 1, said view also showing the clutch members in engagement;

Fig. 4 is a view on the line 4—4, Fig. 3, looking toward the top of the sheet;

Fig. 5 is a sectional view on the same line 4—4, Fig. 3, looking toward the bottom of the sheet;

Fig. 6 is a section on the line 6—6, Fig. 3;

Fig. 7 is a similar view showing the brake in section and the driven clutch member in position to permit the brake to become operative;

Figure 1:
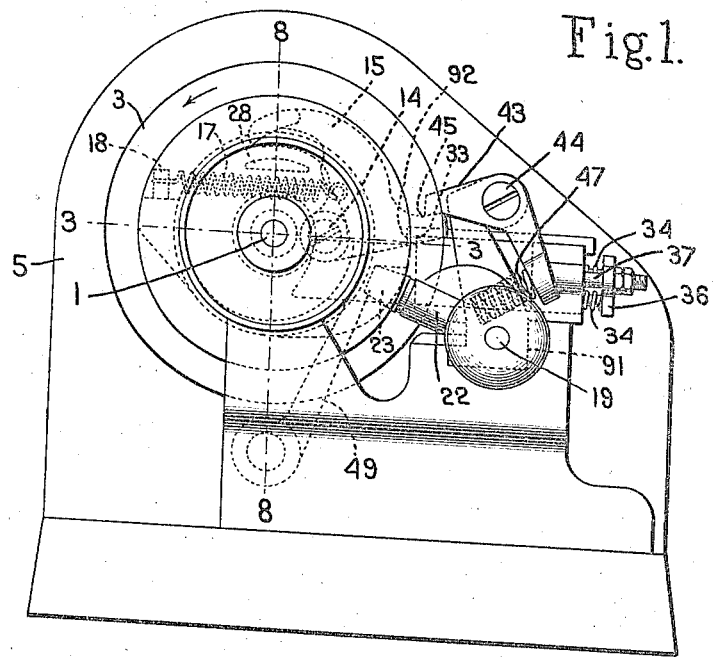
Figure 1 is an end view of a device embodying my invention.

While my invention may be applied to positive clutches of different types, I have chosen herein to illustrate it as it might be applied to a clutch shown in United States Letters Patent No. 367,063, dated July 26, 1887. The clutch illustrated in said patent comprises a driving clutch member having a clutch-engaging shoulder and a driven member carrying a pivoted clutch dog which in one position is adapted to engage said shoulder and thus provide the clutching engagement between the clutch members.

In the illustrated embodiment of my invention, 1 indicates the shaft which is to be driven, 2 the driven clutch member thereon, and 3 the driving clutch member. The shaft 1 may be the driving or operating shaft of any suitable machine, a portion of which is indicated at 5. The driving clutch member 3 is in the form of a driving pulley and is provided with a belt-receiving groove 6 to receive the driving belt. This driving clutch member is loosely mounted on the shaft 1, and it is formed with the hub 7 on which is loosely mounted a cam member 8 that is provided with the clutching shoulder 9. This cam member 8 is mounted on the hub 7 so as to have a slight yielding movement, and for this purpose, it is provided with a stud 10 which extends through a slot 11 formed in the driving clutch member 3 and which is acted upon by a spring 12 received in a chamber 13 formed in the member 3. The function of this spring will be presently described.

Figure 8:
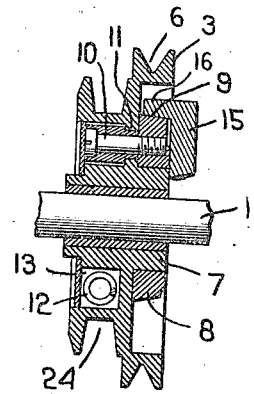
Fig. 8 is a section on the line 8—8, Fig. 1.
Figure 9:
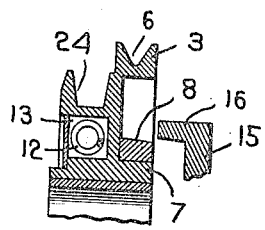
Fig. 9 is a section similar to Fig. 8, but showing the clutch members disengaged.

The driven clutch member 2 is shown in end view in Fig. 4 and it has a clutch dog 15 pivoted thereto at 14, said clutch dog being provided with a laterally-extending nose or projection 16 that is adapted to have clutching engagement with the shoulder 9, all as illustrated in the above-mentioned patent. The clutch dog is acted upon by a pulling spring 17, one end of which is connected to the clutch dog and the other end of which is secured to a post 18 carried by the clutch member 2. The driven clutch member 2 is fast on the shaft 1. When the two clutch members are in operative engagement, the nose 16 of the clutch dog 15 is in engagement with the shoulder 9 of the driving clutch member 3, as shown in dotted lines, Fig. 1, and in Fig. 8, so that the rotation of the driving clutch member in the direction of the arrow, Fig. 1, will give rotation to the driven clutch member, the two clutch members being thus positively locked together.

In my improved clutch device the clutch members are thrown into and out of engagement by moving the clutch member 3 longitudinally of the shaft. The movement of the clutch member 3 away from the clutch member 2 will withdraw the shoulder 9 laterally from the nose 16 of the clutch dog 15, thus disengaging the clutch. The movement of the clutch members toward each other will bring the nose 16 into engagement with the clutch shoulder 9, thus rendering the clutch operative. This clutching and unclutching movement of the clutch member 3 may be secured in various ways. I have herein shown for this purpose a clutch actuator in the form of a rod 19 slidably mounted in bearings 20 carried by the machine 5 and having fast thereon a block 25 which slides in ways 91 formed in the portion 90 of the machine 5. The actuator 19 extends loosely through another block 21 which is also slidably carried in the ways 91 and is provided with a laterally-extending arm 22 carrying a roll 23 that is received in a groove 24 formed in the driving clutch member 3. The block 21 is yieldingly held against the block 25 by a spring 26 which surrounds the actuator and one end of which engages a head 27 on the actuator and the other end of which is received in a recess formed in the block 21. Movement of the actuator 19 toward the bottom of Fig. 3 will positively move the block 21 and thereby disengage the clutch. Movement of the clutch actuator in the opposite direction will cause the clutch members to be brought into engagement. The function of the spring 26 will be presently described.

As stated above, one of the objects of the present invention is to provide a positive clutch of the type illustrated which is so constructed that when the two clutch members are thrown into clutching engagement there will be a gradual picking up of the driven clutch member before the two clutch members come into positive driving connection, thus providing for a gradual starting of the driven element 1. The construction is also such that the driving clutch member 3 can be moved toward the driven clutch member 2 only when the two clutch members are in such a predetermined angular position relative to each other that the driven clutch member can make nearly one revolution before the clutch shoulder 9 comes into positive engagement with the nose 16 of the clutch dog 15.

This allows a time interval equal to that consumed by substantially one rotation of the driving clutch member in which the driven clutch member can receive its initial movement, so that when the clutch shoulder 9 comes into engagement with the nose 16 of the clutch dog 15, the driven clutch member will be under way with the result that there will be no jar or shock such as would be occasioned by the rapidly-rotating clutch shoulder 9 coming into engagement with the stationary clutch dog 15.

When the clutch is disengaged the spring 17 tends to turn the clutch dog 15 thereby to swing the nose 16 thereof toward the shaft 1, and the movement of the clutch dog due to the action of the spring 17 is limited by a stop 28 on which the nose 16 rests. The cam member 8 on which the clutch shoulder 9 is formed is provided with an eccentric peripheral surface, said surface presenting the low portion 29 just beyond the shoulder 9, and the eccentric portion 30 extending from the low portion 29 to the clutch shoulder 9. When the clutch is disengaged and the nose 16 of the clutch dog 15 is in engagement with the rest 28, said nose is so positioned relative to the periphery of the cam 8 that the driving clutch member 3 can be moved into clutching position only when the low portion 29 is opposite the nose 16. If the driving clutch member 3 is in any other angular position, the nose 16 will engage the side of the cam member 8 and thus prevent the driving clutch member from being moved into its clutching position.

Figure 2:
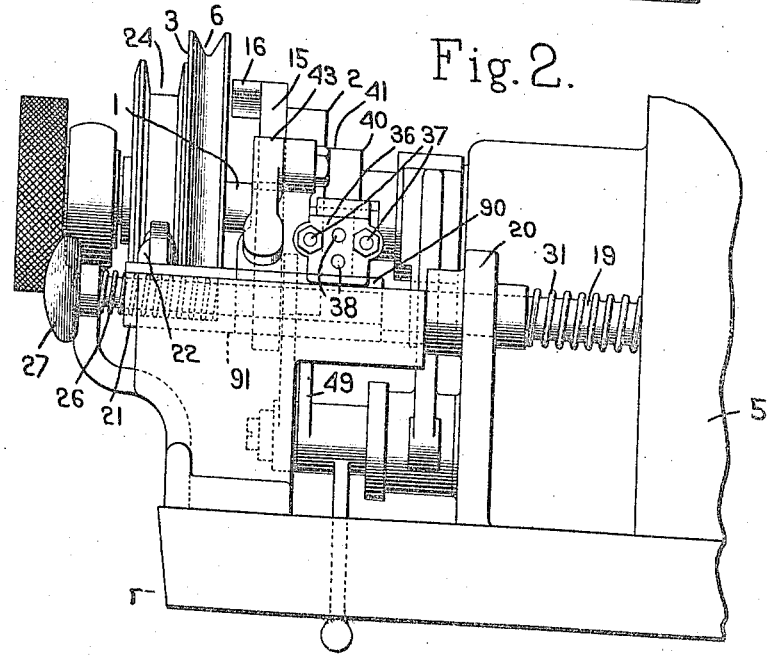
Fig. 2 is a view of the device of Fig. 1 looking from the right, and showing the two clutch members disengaged.

When the clutch is to be engaged the clutch actuator 19 is moved toward the right, Fig. 2, and this will bring the nose 16 against the side face of the cam member 8, and said nose will bear against the side face of said cam member 8 until during the rotation of the driving clutch member 3, the low portion 29 of said cam member 8 comes opposite the nose 16. When this position is reached, the driving clutch member can then move longitudinally so as to bring the low portion 29 of the cam under the nose 16. As the driving clutch member 3 continues to rotate, the eccentric portion 30 of the cam 8 will act on the nose 16 and thus turn the clutch dog about its pivot 14 against the action of the spring 17. As the nose 16 rides up the eccentric surface 30 of the clutch cam, the friction developed will gradually start the driving clutch member rotating. When the driving clutch member has rotated sufficiently to bring the shoulder 9 against the nose 16, then the clutch elements are in positive engagement, but by this time the driven clutch element has been started in motion so that the engagement of the shoulder 9 with the nose 16 will not cause any detrimental jar or shock. The spring 12 acts as a further means to assist the cushioning movement of the clutch when it is thrown into engagement, for when the shoulder 9 comes into engagement with the nose 16, the spring 12 can yield slightly.

The spring 26 is for the purpose of permitting the full movement of the clutch actuator 19 when the clutch is to be engaged, for if at the time of the operation of the clutch actuator 19, the driving clutch element is in such position that the side of the cam 8 will be brought against the nose 16, the spring 26 will yield to permit the full movement of the clutch actuator, and as soon as the driving clutch member has rotated into a position to bring the low portion 29 of the cam opposite the nose 16, then the expansive action of the spring 26 will complete the clutching movement of the driving clutch member. The clutch actuator 19 may be operated by any suitable means which it is not necessary to show. Preferably, however, some usual means such, for instance, as a latch (not shown) will be provided for locking the clutch member 19 in its position shown in Fig. 3. When the clutch is to be disengaged, this latch may be released and the clutch actuator will then be moved to the left, Fig. 2, through the action of a spring 31, as usual in many clutch devices.

My improved clutch is so constructed that when the clutch is disengaged, the driven member will be brought to rest with a gradual movement and inevitably in a predetermined angular position. I provide for this by a novel brake mechanism which operates to apply a braking action to the driven member when the clutch is disengaged and a stop device to engage the clutch dog when the driven member reaches its predetermined position. The braking member is shown at 32 and is in the form of a bar slidably mounted transversely in the block 25 carried by the clutch actuator 19. This braking member 32 is acted upon by springs 34 which urge it toward the left in Figs. 1 and 3. These springs are received in recesses 35 formed in the braking member and are backed by a yoke 36 which is adjustably secured on studs 37 carried by the block 25. This yoke has guide pins 38 extending therefrom which enter the recesses 35 and assist in guiding the braking member 32. The forward spring-pressed movement of the braking member 32 is limited by a stop lug 92 on the block 25 which is adapted to engage a shoulder 33 on the braking member. The clutch member 2 is provided with a hub 39 and the stepped portion 40 having the eccentric braking surface 41. At one point as, for instance, 42 in Fig. 6, the surface of the stepped portion 40 is in line with the periphery of the hub 39. When the clutch is to be disengaged and the latch holding the clutch actuator 19 is released, the expansive action of the spring 31 tends to move the clutch actuator to the left in Fig. 2, and this will bring the braking member 32 against the side face of the stepped portion 40. When during the rotation of the driven clutch member, the low portion 42 of the stepped portion 40 comes opposite the braking member 32, then the spring 31 can act to move the clutch actuator to the left, Fig. 2, thus carrying the braking member 32 in position to engage the eccentric braking surface 41. The continued rotation of the driven clutch member causes the eccentric braking surface 41 to act on the end of the brake 32, thus forcing the brake backwardly against the action of the springs 34. The springs 34 are of sufficient stiffness so that the braking pressure which is thus applied will very materially reduce the speed of the driven clutch member. For bringing the driven clutch member positively to rest at a predetermined point, I have provided a stop dog 43 which is pivoted at 44 to the block 25 that is carried by the clutch actuator. When the clutch is in operation, the stop dog is situated at one side of the clutch dog. When, however, the clutch actuator 19 is moved to the left, Fig. 2, to disengage the clutch, the stop dog 43 is carried into the plane of rotation of the clutch dog 15. The clutch dog 15 is provided with a tail 45 of such a length that it will be brought into engagement with the stop dog 43 when said stop dog has been moved into the plane of rotation of the clutch dog. The low part 42 of the stepped portion 40 is so situated relative to the clutch dog that the braking action begins just after the tail of the clutch dog has passed the stop dog 43, so that the brake will be acting through nearly one complete revolution of the driven member before the tail 45 of the clutch dog engages the stop dog 43. The spring 17 resists the turning action of the clutch dog 15 when it engages the stop dog 43 and thus cushions the stopping movement. The clutch member 2 is provided with the rest 46 with which the clutch dog engages when the tail of the latter strikes the stop dog 43, and the stop dog is acted upon by a spring 47 which cushions the stopping movement. The tension of the springs 34 will be so adjusted by means of the set nuts 48 as to cause the braking member 32 to apply sufficient pressure to the braking surface 41 to bring the driven clutch member nearly to rest before the tail 45 of the clutch dog comes into engagement with the stop dog 43. 49 indicates a latch adapted to engage in a notch in the driven member thereby to prevent rebound thereof.

Figure 10:
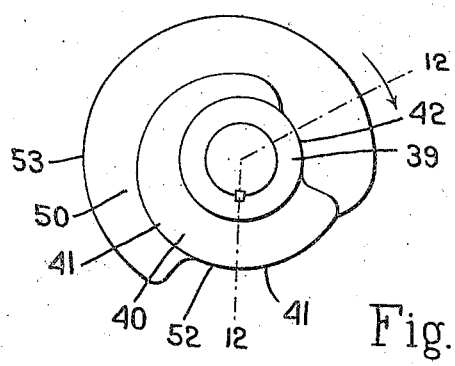
Fig. 10 is a portion of the driven clutch member having a different form of brake surface from that shown in Fig. 7.
Figure 11:
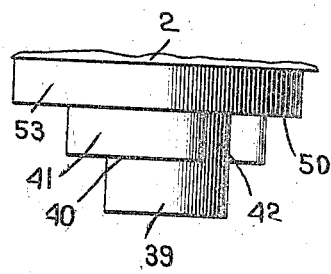
Fig. 11 is a plan view of Fig. 10.
Figure 12:
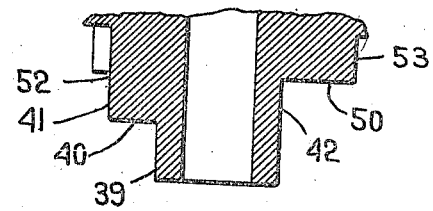
Fig. 12 is a section on the line 12—12, Fig. 10.

The construction shown in Fig. 6 is such that the driven clutch member will be brought to rest within one revolution. If it is desired to bring the driven clutch member to rest with a more gradual movement such as would occur if the braking action were applied through two revolutions, I may use the type of brake drum shown in Fig. 10. This has the two stepped portions 40 and 50 which are so arranged that the high portion of the eccentric surface 41 is in line with the low portion 52 of the stepped portion 50, and the latter has also an eccentric surface 53. With this arrangement, when the clutch actuator is released, the brake member 32 will act first on the stepped portion 40 and then will pass onto the stepped portion 50 so that there will be a braking action during substantially two revolutions of the driven member. With this embodiment, the stop dog 43 will be so positioned that it will be brought into the plane of movement of the tail 45 of the clutch dog only when the braking member 32 has been carried onto the second stepped portion 50.

While I have illustrated herein a selected embodiment of my invention, I do not wish to be limited to the constructional features shown.

I claim:

1. In a clutch mechanism, the combination with two clutch members movable toward and from each other, of a spring-pressed clutch dog pivoted to one member and provided with a nose, a stop on said member to limit the inward spring-pressed movement of said dog, the other clutch member having an eccentric surface presenting at one end a low portion and terminating at the other end in a clutching shoulder, said stop positioning the dog so that when the two clutch members are moved into relative clutching position, the nose of the dog will be carried over the low portion of the eccentric surface whereby rotation of the driving clutch member will cause said nose to move over said eccentric surface and thereby gradually start the driving member and will then be brought into clutching engagement with said shoulder.

2. In a device of the class described, the combination with a driving clutch member, of a driven clutch member, said clutch members being movable toward and from each other to bring them into and out of clutching engagement, a spring-pressed clutch dog pivoted to the driven clutch member and provided with a nose, the driving clutch member having an eccentric surface provided at one end with a low portion and terminating at the other end in a clutch shoulder, and a stop on the driven clutch member to limit the inward spring-pressed swinging movement of the dog to a position in which the nose thereof will be carried over the low portion of the eccentric surface when the clutch members are moved into clutching relation, whereby when said clutch members are first brought into clutching engagement, the rotation of the driving clutch member relative to the driven clutch member will cause said nose to move over the eccentric surface and thereby gradually start the driven clutch member and then to come into clutching engagement with said clutch shoulder.

3. In a device of the class described, the combination with two clutch members movable toward and from each other, one of which has a clutch shoulder, of a clutch dog pivoted to the other member and adapted to have positive clutching engagement with said shoulder when said two members are in relative clutching position, and means to prevent relative movement of said members into clutching position except when they are in a predetermined angular relative position.

4. In a device of the class described, the combination with a driving and a driven clutch member movable toward and from each other to bring them into and out of clutching engagement, the driving clutch member having a clutch shoulder thereon, of a clutch dog pivoted to the driven clutch member and adapted to have positive clutching engagement with said shoulder when the two members are in relative clutching position, and means to prevent relative movement of said members into clutching position except when they are in a predetermined angular position.

5. In a device of the class described, the combination with two clutch members movable toward and from each other, one of which has a clutch shoulder, of a clutch dog pivoted to the other member and adapted to have positive clutching engagement with said shoulder when said two members are in relative clutching position, and means to prevent relative movement of said members into clutching position except when they are in a predetermined angular relative position different from their relative angular position when the dog has clutching engagement with said shoulder.

6. In a device of the class described, the combination with a driving and a driven clutch member movable toward and from each other, the driving clutch member having a clutch shoulder, of a clutch dog pivoted to the driven clutch member and adapted to have positive clutching engagement with said shoulder when said two members are in relative clutching position, means to prevent relative movement of said members into clutching position except when they are in a predetermined angular relative position different from their relative angular position when the dog has clutching engagement with said shoulder, and means operative while the clutch members are turning relatively from their initial to their final clutching position to provide sufficient frictional engagement to cause the driven clutch member to be started in rotation.

7. In a clutch, the combination with a driving clutch member having a clutch shoulder, of a driven clutch member, means for moving said clutch members toward and from each other to bring them into and out of clutching engagement, a clutch dog pivoted to the driven clutch member and adapted to have clutching engagement with said shoulder when the two members are in relative clutching position, means to prevent a relative movement of said clutch members into clutching position except when the two members have a relative angular position different from that which they have when the clutch dog is in clutching engagement with the clutch shoulder, and means operative after the two clutch members have been brought into relative clutching position and while the driving clutch member is turning angularly relative to the driven clutch member to produce sufficient frictional engagement between said clutch members to start the driven clutch member in rotation.

8. In a device of the class described, the combination with a driving clutch member, of a driven clutch member having an eccentric surface provided at one end with a low portion and terminating at the other end in a clutch shoulder, a spring-pressed clutch dog pivoted to the driven member to swing about an axis parallel to the axis of rotation, said dog having a nose, a stop on said driven clutch member to limit the inward swinging movement of the dog in a position which corresponds with the low portion of the eccentric surface, and means to move the driving clutch member toward the driven clutch member thereby to bring the nose over the low portion of the eccentric surface whereby rotation of the driving clutch member will carry said nose over the eccentric surface and into engagement with the clutch shoulder.

9. In a device of the class described, the combination with a driving and a driven clutch member, movable toward and from each other to bring them into and out of clutching engagement, the driven clutch member having an eccentric braking surface, of a clutch actuator movable in a direction parallel to the axis of rotation for giving the clutch members their relative movement toward and from each other, and a spring-pressed brake member movable with the clutch actuator and situated to be brought into engagement with the braking surface when the clutch is disengaged.

10. In a device of the class described, the combination with a driving and a driven clutch member movable toward and from each other to bring them into and out of clutching engagement, the driven clutch member having an eccentric breaking surface, of a clutch actuator movable in a direction parallel to the axis of rotation for giving the clutch members their relative movement, a spring-pressed brake member movable with the clutch actuator, means operative when the clutch members are engaged to hold the brake member in a position corresponding to the low portion of the eccentric breaking surface whereby movement of the clutch actuator to disengage the clutch will carry said brake member over the low portion of the eccentric surface and in position to be acted on by said braking surface as the driven clutch member rotates.

11. In a device of the class described, the combination with a driving and a driven clutch member, the driving clutch member having a clutch shoulder, of a clutch dog pivoted to the driven clutch member and provided with a nose to engage said shoulder and also provided with a tail, a clutch actuator for moving the driving clutch member toward and from the driven clutch member to bring said clutch members into and out of clutching engagement, and a stop dog movable with the clutch actuator and adapted to be brought into the path of movement of the tail of the clutch dog when the clutch is disengaged whereby the driven clutch member will be brought to rest.

12. In a device of the class described, the combination with a driving and a driven clutch member, the driving clutch member having a clutch shoulder, of a clutch dog pivoted to the driven clutch member and provided with a nose to engage said shoulder and also provided with a tail, a clutch actuator movable in a direction parallel to the axis of rotation of said clutch members to move the driving clutch member into and out of clutching engagement with the driven clutch member, and a clutch dog movable with the clutch actuator and adapted to be brought into the path of movement of the tail of the clutch dog by the unclutching movement of said actuator whereby the driven clutch member will be brought to rest.

13. In a device of the class described, the combination with a driving and a driven clutch member, the driving clutch member having a clutch shoulder, of a clutch dog pivoted to the driven clutch member and provided with a nose to engage said shoulder and also provided with a tail, a clutch actuator movable in a direction parallel to the axis of rotation of said clutch members to move the driving clutch member into and out of clutching engagement with the driven clutch member, a clutch dog movable with the clutch actuator and adapted to be brought into the path of movement of the tail of the clutch dog by the unclutching movement of said actuator whereby the driven clutch member will be brought to rest, and means controlling the unclutching movement of said clutch actuator which permits said actuator to have its unclutching movement only when the driven clutch member is in a predetermined angular position.

14. In a device of the class described, the combination with a driving and a driven clutch member, the driving clutch member having a clutch shoulder, of a clutch dog pivoted to the driven clutch member and provided with a nose to engage said shoulder and also provided with a tail, a clutch actuator movable in a direction parallel to the axis of rotation of said clutch members to move the driving clutch member into and out of clutching engagement with the driven clutch member, a clutch dog movable with the clutch actuator and adapted to be brought into the path of movement of the tail of the clutch dog by the unclutching movement of said actuator whereby the driven clutch member will be brought to rest, and means controlling the unclutching movement of said clutch actuator which permits said actuator to have its unclutching movement only when the driven clutch member is in a predetermined angular position which is different from that in which the tail of the clutch dog engages the stop dog.

15. In a device of the class described, the combination with a driving and a driven clutch member, the driving clutch member having a clutch shoulder, of a clutch dog pivoted to the driven clutch member and provided with a nose to engage said shoulder and also provided with a tail, a clutch actuator movable in a direction parallel to the axis of rotation of said clutch members to move the driving clutch member into and out of clutching engagement with the driven clutch member, a clutch dog movable with the clutch actuator and adapted to be brought into the path of movement of the tail of the clutch dog by the unclutching movement of said actuator whereby the driven clutch member will be brought to rest, means controlling the unclutching movement of said clutch actuator which permits said actuator to have its unclutching movement only when the driven clutch member is in a predetermined angular position which is different from that in which the tail of the clutch dog engages the stop dog, and means to apply a friction brake to the driven clutch member after the clutch member has been moved into unclutching position and before the tail of the clutch dog engages the stop dog.

In testimony whereof, I have signed my name to this specification.

ALFRED S. MELLO.